United States Patent [19]
Goto et al.

[11] Patent Number: 5,503,923
[45] Date of Patent: Apr. 2, 1996

[54] MOLDED SANDWICH ARTICLE

[75] Inventors: Masaomi Goto; Masao Kobayashi; Junji Koizumi; Hiroshi Mukai; Takahiko Sato; Daiichiro Kawashima, all of Aichi, Japan

[73] Assignee: Toyoda Gosei Co., Ltd., Aichi, Japan

[21] Appl. No.: 233,855

[22] Filed: Apr. 26, 1994

[30] Foreign Application Priority Data

Apr. 27, 1993 [JP] Japan .................................. 5-101540
Apr. 27, 1993 [JP] Japan .................................. 5-101542
May 20, 1993 [JP] Japan .................................. 5-118756

[51] Int. Cl.$^6$ ............................................. B32B 5/16
[52] U.S. Cl. ........................ 428/324; 428/515; 428/516; 428/517
[58] Field of Search ...................... 428/517, 515, 428/516, 324

[56] References Cited

U.S. PATENT DOCUMENTS

| | | | |
|---|---|---|---|
| 4,917,944 | 4/1990 | Breitsch et al. | 428/517 |
| 5,106,696 | 4/1992 | Chundury et al. | 428/517 |
| 5,302,463 | 4/1992 | Murata et al. | 428/517 |
| 5,347,759 | 9/1994 | Kobayashi et al. | 49/496.1 |
| 5,372,881 | 12/1994 | Roller et al. | 428/339 |

FOREIGN PATENT DOCUMENTS 4366635 12/1992 Japan .

*Primary Examiner*—Edith Buffalow
*Attorney, Agent, or Firm*—Cushman Darby & Cushman

[57] ABSTRACT

A sandwich molding comprising:
  a core layer covered by the skin layer
  said skin layer comprising either an olefin-based thermoplastic elastomer or a styrene-based thermoplastic elastomer,
  said core layer comprising either a mixture comprising at least a crystalline polypropylene resin and an ethylene-α-olefin copolymer or a mixture comprising at least a crystalline polypropylene resin and a styrene-based elastomer.

8 Claims, 5 Drawing Sheets

MOLDED SANDWICH ARTICLE

FIELD OF THE INVENTION

This application incorporates by reference the entire contents of Japanese Patent Application No. Hei 5-101540, filed Apr. 27, 1993.

The present invention relates to a sandwich molding formed by a sandwich molding method, e.g., a side molding to be attached to an exterior automotive body side, and also to a process for molding the article.

BACKGROUND OF THE INVENTION

Exterior automotive trims made of resin, e.g., side moldings to be attached to exterior body sides, have hitherto been required not only to be less apt to suffer surface marring (for instance, from collision with objects) but to have other characteristics such as good dimensional stability and minimal thermal expansion. It is, however, difficult to form a side molding satisfying these requirements from a single resinous material. For example, a side molding made of a styrene-based thermoplastic elastomer alone has a high coefficient of linear expansion and therefore exhibits poor dimensional stability, although it is excellent in resisting marring. In contrast, the side moldings made of resinous materials having lower coefficients of linear expansion are inferior in marring resistance.

As an expedient for imparting low linear expansion to a sandwich molding as a whole while maintaining the marring resistance of the styrene-based thermoplastic elastomer, a side molding 21 as illustrated in FIGS. 4 and 5 has been proposed which has a sandwich structure consisting of a skin layer 22 and a core layer 23 (see, for example, JP-A-4-366635). (The term "JP-A" as used herein means an "unexamined published Japanese patent application".) In this side molding 21, the skin layer 22 is made of a styrene-based thermoplastic elastomer, while the core layer 23 is made of a mixture comprising a crystalline polypropylene resin having a low coefficient of linear expansion and an ethylene-α-olefin copolymer.

The side molding 21 having the structure described above is produced by a sandwich molding method. In this method, which is one mode of injection molding, a molten resin for forming a skin layer is first injected into a mold cavity and a molten resin for forming a core layer is injected shortly thereafter. Then, a small amount of the molten resin is again injected for skin layer formation. Thus, by this method the two kinds of molten resins packed into the cavity are cooled and solidified almost simultaneously.

Although the prior art technique described above can meet both of the requirements described hereinabove (e.g., marring resistance and dimensional stability), no measures have been taken against certain undesirable phenomenon occurring in the sandwich molding. For instance, the skin layer 22 sometimes develops linear sink marks (depressions) 24 at its surface parts corresponding to the side edges of the core layer 23. Sink marks 24 having a depth of less than 5 μm, are not recognizable by the naked eye, and typically are not regarded as problematic. However, if the sink marks 24 have a depth of 5 μm or larger, they may be seen by the naked eye and therefore impair the quality of appearance of the side molding 21.

It is thought that the generation of the sink marks 24 is attributable to the contraction upon cooling of the molten resin for skin layer formation and of the molten resin for core layer formation. That is, because crystalline polypropylene resin component has the largest shrinkage in the material for forming the core layer 23 and because it melts upon heating to usually 220°–230° C. and crystallizes when cooled to about 120°–130° C., molten resin containing crystalline polypropylene resin also shrinks considerably during cooling due to the shrinking of the crystalline polypropylene resin during crystallization. It is thought that this contraction of the molten resin occurs mainly in the width, as shown by the arrows in FIG. 5 (lateral direction in the drawing).

On the other hand, the molten resin for skin layer formation also shrinks during cooling. Since this contraction takes place along with the contraction of the molten resin for core layer formation as a matter of course, the two contractions affect each other.

If the shrinkage of the molten resin for skin layer formation and that of the molten resin for core layer formation are almost the same, (that is, if the shrinkage of the crystalline polypropylene resin in the layer 22 and the shrinking of the crystalline polypropylene resin in the layer 23 are almost the same), the sink marks 24 are not formed. Actually, however, the molten resin for core layer formation shrinks more than that for skin layer formation when the two molten resins cool and solidify in the mold cavity. In other words, the crystalline polypropylene resin in the core layer 23 shrinks more than that in the skin layer 22. Thus, it is assumed that an excessive stress is imposed on those parts of the surface of the skin layer 22 which correspond to the side edges of the core layer 23, so as to buffer the shrinking difference. As a result, the linear sink marks 24 are generated on the surface of the skin layer 22.

Illustratively stated, since the molten resin for skin layer formation has high flowability, it shrinks while being pulled in the arrow directions due to the contraction of the molten resin for core layer formation. It is assumed that an excessive stress is imposed, during this contraction, on those parts of the surface of the skin layer 22 which correspond to the side edges of the core layer 23 and, as a result, the visible sink marks 24 having a depth of 5 μm or larger are generated on the surface of the skin layer 22.

SUMMARY OF THE INVENTION

The present invention has been developed in order to resolve the problem described above. An object of the present invention is to provide a sandwich molding which prevents, during molding, the generation of visible sink marks on the skin layer surfaces corresponding to the side edges of the core layer and which, therefore, can have an improved quality in appearance, while retaining marring resistance and dimensional stability. Another object of the present invention is to provide a process for molding the sandwich article.

The objects described above are achieved by the present invention. Specifically, the invention relates to a sandwich molding including a core layer which is covered by a shin layer. The skin layer includes either an olefin-based thermoplastic elastomer or a styrene-based thermoplastic elastomer. The core layer includes either a mixture comprising at least a crystalline polypropylene resin and an ethylene-α-olefin copolymer, or a mixture comprising at least a crystalline polypropylene resin and a styrene-based elastomer.

The skin layer and core layer may be formed by a sandwich molding method. In particular, the skin layer and the core layer are formed with materials such that, in the temperature range of from 100° C. to 180° C., the total heat of fusion for the crystalline resin contained in the core layer and the total heat of fusion for the crystalline resin contained in the skin layer varies 7 cal/g or less.

Preferably, the skin layer and the core layer are formed by injecting a first molten resin for forming the skin layer into a cavity of a mold having a slide core. Then a second molten resin for forming the core layer is injected almost simultaneously with or after the injection of the first molten resin in such a manner that the second molten resin injected is enveloped in the first molten resin. The slide core is moved in the a direction that the volume of the cavity is reduced, after the first and second molten resins have been injected in predetermined amounts. The first and second molten resins to solidified by cooling.

DETAILED DESCRIPTION OF THE INVENTION

Figure 1:
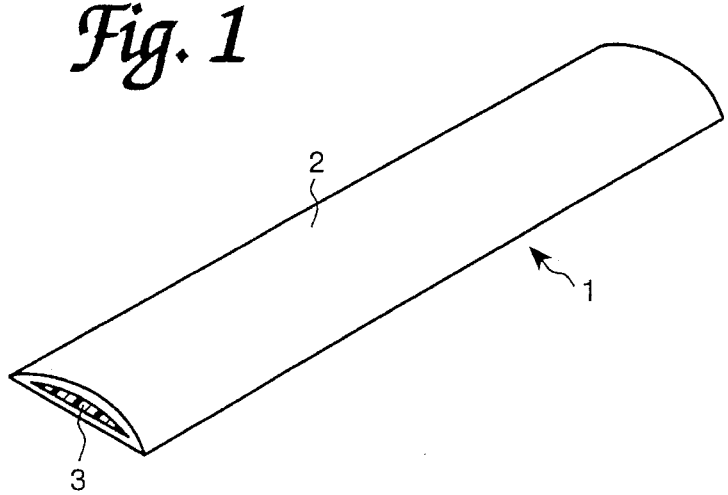
FIG. 1 is a perspective view of a side molding as an embodiment of the sandwich molding of the present invention.

The skin layer of the present invention preferably may contain a filler in an amount of 1 to 50 wt %, preferably 1 to 30 wt %, based on the total components of the skin layer The flow and contraction of the molten resin for the skin layer formation can be controlled by containing a filler in the above amount. As a result, generation of the sink marks due to the contraction of the molten resin is prevented. However, if the amount of filler is more than 50 wt %, the pliability and marring resistance of the skin layer after molding are impaired.

The sandwich molding formed by the method described above is protected against marring due to the skin layer as the external component. Additionally, the sandwich molding retains good dimensional stability because of the diminished thermal expansion, which is due to the core layer as the central component.

In a preferred embodiment of the present invention, an excellent sandwich molding which achieves the objects of the present invention can be obtained by sandwich-molding a core layer and a skin layer comprising either an olefin-based thermoplastic elastomer containing at least a crystalline polypropylene resin in an amount of 10% by weight or more based on the total components of the skin layer, or a styrene-based thermoplastic elastomer containing at least a crystalline polypropylene resin in an amount of 10% by weight or more based on the total components of the skin layer.

The sandwich molding method of the present invention means a method for molding the article having a laminated structure by means such as an injection molding method, a multi-layered extrusion molding method and a multi-layered blow molding method.

The skin layer 2 is preferably one formed by using either an olefin-based thermoplastic elastomer containing a crystalline polypropylene resin in an amount of 10% by weight or more based on the total components of the skin layer, or a styrene-based thermoplastic elastomer containing a crystalline polypropylene resin in an amount of 10% by weight or more based on the total components of the skin layer. The olefin-based thermoplastic elastomer herein means one comprising a hard segment consisting of polypropylene or a mixture of polypropylene and polyethylene and a soft segment consisting of an ethylene-propylene rubber (EPM) or an ethylene-propylene-diene terpolymer (EPDM), in which the EPM and EPDM each may be crosslinked partly or completely.

The styrene-based thermoplastic elastomer herein means a copolymer comprising a hard segment consisting of polystyrene and a soft segment consisting of an elastomer such as polybutadiene, polyisoprene, hydrogenated polybutadiene, or hydrogenated polyisoprene. Examples of the styrene-based thermoplastic elastomer include styrene-ethylene-butylene-styrene copolymers (SEBS), styrene-butadiene-styrene block copolymers (SBS), styrene-isoprene-styrene block copolymers (SIS), styrene-ethylene-propylene copolymers (SEP), and styrene-ethylene-propylene-styrene copolymers (SEPS). Among these, the SEBS and SEPS are preferred.

Examples of the crystalline polypropylene resin to be contained in the olefin-based or styrene-based thermoplastic elastomer include propylene homopolymer, ethylene-propylene block copolymers, ethylene-propylene random copolymers, and mixtures thereof. The content of the crystalline polypropylene resin in the skin layer 2 is preferably 10% by weight or higher, more preferably 20 to 60% by weight, based on the total components of the skin layer.

For the purpose of regulating the flowability, hardness, heat resistance, oil resistance, and other properties of the olefin-based or styrene-based thermoplastic elastomer, various ingredients may be incorporated into the elastomer. Examples of such optional ingredients include crystalline low-density polyethylene (LDPE), linear low-density polyethylene (L-LDPE), high-density polyethylene (HDPE), oils, and modifiers for improving coating suitability which contain hydroxyl groups or other groups. These optional ingredients may be added alone or in a mixture or other form.

The skin layer 2 may contain a filler. Examples of the filler include non-fibrous fillers such as calcium carbonate, talc, clay, mica, silica, and barium sulfate and fibrous fillers (preferably having a fiber diameter of 3 μm or less) such as potassium titanate whiskers and magnesium oxysulfate whiskers. Among these, talc, calcium carbonate and potassium titanate whiskers are preferred. The filler content in the skin layer 2 is preferably from 1 to 50% by weight, more preferably 1 to 30% by weight, based on the total components of the skin layer. The flow and contraction of the molten resin for the skin layer formation can be controlled by containing the filler in the above amount. As a result, generation of the visible sink marks is prevented. If the filler content exceeds 50% by weight, the pliability and marring resistance of the skin layer 2 after molding are impaired.

On the other hand, the core layer 3 includes either a mixture comprising at least a crystalline polypropylene resin and an ethylene-α-olefin copolymer or a mixture comprising at least a crystalline polypropylene resin and a styrene-based elastomer. The amount of the above mixture contained in the core layer 3 is preferably 60 to 85% by weight based on the total components of the core layer.

Examples of the crystalline polypropylene resin for use in forming the core layer 3 include propylene homopolymer, ethylene-propylene block copolymers, ethylene-propylene random copolymers, and mixtures thereof.

The ethylene-α-olefin copolymer for use in forming the core layer 3 is a copolymer of ethylene and an α-olefin such as propylene, 1-butene, 1-decene, 4-methyl-1-butene, or the like, with an ethylene-propylene copolymer (EPR) being especially advantageous. A more preferred EPR is one having a Mooney viscosity $ML_{1+4}$ (100° C.) of less than 70.

The styrene-based elastomer for use in forming the core layer 3 is one made up of one or more polystyrene hard segments and one or more soft segments. Examples of the styrene-based elastomer include copolymers such as SEBS, SBS, SIS, SEP, and SEPS. Among these, SEBS and SEPS are preferred.

For the purpose of regulating dimensional stability, hardness, elasticity, and other properties, an inorganic filler may be preferably incorporated into the core layer 3 in an amount of 15 to 40% by weight. Examples of the inorganic filler include talc, mica, wollastonite, clay, glass fibers, rock wool, magnesium sulfate whiskers, potassium titanate whiskers, and calcium carbonate whiskers. Among these, talc, mica, and potassium titanate whiskers are preferred.

In sandwich molding, the molten resin for skin layer formation and the molten resin for core layer formation are cooled almost simultaneously. Although both of the molten resins shrink during the cooling, the contraction of the molten resin for skin layer formation is more apt to be affected by the contraction of the molten resin for core layer formation. That is, the molten resin for skin layer formation is subjected to a pulling force from the contraction of the molten resin for core layer formation. In the present invention, however, when the molten resin for skin layer formation contains a filler, the flow of the molten resin for skin layer formation is controlled by the function of the filler. In other words, the filler functions to maintain the shape of the molten resin for skin layer formation. Due to this effect of the filler, even when the molten resin for core layer formation shrinks considerably during the cooling of the two molten resins for skin layer formation and core layer formation, the molten resin for skin layer formation will withstand the pulling force attributable to the contraction of the molten resin for core layer formation to retain its shape. It is thought that the contraction of the molten resin for skin layer formation is thus controlled and, as a result, the generation of sink marks attributable to the contraction is diminished or prevented.

Also, in sandwich molding, the molten resin for skin layer formation and the molten resin for core layer formation are cooled almost simultaneously, during which cooling the two molten resins each shrink. The component having the greatest shrinkage in the skin layer-forming material is a crystalline resin. Similarly, the component having the greatest shrinkage in the core layer-forming material is a crystalline resin. Therefore for both the molten resin for skin layer formation and the molten resin for core layer formation, shrinkage occurring during cooling and solidification is governed mainly by the shrinkage of the crystalline resin.

On the other hand, the generation of sink marks on the skin layer surface is significantly diminished. This is particularly true when the variation of the total heat of fusion in the range of from 100° to 180° C. for the crystalline resin (mostly a crystalline polypropylene resin) contained in the skin layer with that of the crystalline resin (mostly a crystalline polypropylene resin) contained in the core layer is 7 cal/g or less, each total heat of fusion being determined experimentally. This may be because the total heat of fusion of the crystalline resin contained in the skin layer is proportional to the shrinkage of the crystalline resin during the crystallization thereof from the molten state, while the total heat of fusion of the crystalline resin contained in the core layer is proportional to the shrinkage of the crystalline resin during the crystallization thereof from the molten state. When the total heat of fusion of the crystalline resin in the skin layer is close to that of the crystalline resin in the core layer (i.e., when the variation between the two totals of heat of fusion is 7 cal/g or less), the shrinkages of the two crystalline resins in the two layers are also almost the same.

This means that when the molten resin for skin layer formation and the molten resin for core layer formation cool and solidify, the two resins shrink to almost the same degree. Because of this, excessive stress is not imposed, during the cooling step of the sandwich molding, on those parts of the skin layer surface which correspond to the side edges of the core layer. Thus, the generation of sink marks is inhibited.

According to the invention described hereinabove, a first molten resin for forming a skin layer is injected into the cavity of a mold having a slide core. Simultaneously with or after the injection of the first molten resin, a second molten resin for forming a core layer is injected in such a manner that the second molten resin is enveloped in the first molten resin. After the first and second molten resins have been injected in predetermined amounts, the slide core is moved in such a direction that the volume of the cavity is reduced. Thereafter, the first and second molten resins are cooled and solidified.

By conducting the steps described above, a resin article is molded which comprises a core layer and a skin layer covering the core layer. The first and second molten resins shrink upon cooling in the above process. In the present invention, however, during cooling the two resins are already in a compressed state due to the moved slide core and, hence, the shrinkages of the first and second molten resins upon cooling can be relatively small even when the two resins are not limited. Consequently, there is low or very little stress imposed on each resin as a result of a shrinkage difference.

As an example of an embodiment of the sandwich molding of the present invention, an automotive side molding is explained in detail below with reference to FIGS. 1 and 2, in comparison with comparative examples.

EXAMPLE I

The side molding 1 of this example, which is in strip form as a whole, is to be attached to an exterior automotive body side with a double-sided tape, an adhesive, clips, etc. for the purpose of automotive-body protection or decoration. This side molding 1 consists of a hard core layer 3 having a section of a roughly semicylindrical shape and a soft skin layer 2 in which the core layer 3 is enveloped.

The side molding 1 according to the present invention, which consists of the components described above, is one formed by conventional sandwich molding method. The sandwich molding method is one mode of injection molding. In this method, a molten resin for skin layer formation is first injected into a mold cavity. Several seconds later, injection of the molten resin for skin layer formation is stopped and, simultaneously therewith, injection into the mold cavity of a molten resin for core layer formation is begun. The molten resin for skin layer formation is pushed by the molten resin for core layer formation so as to flow in the cavity. When the cavity is almost filled with the two molten resins, injection of the molten resin for core layer formation is terminated. Then, more molten resin for skin layer formation is injected into the cavity. After the two molten resins cool and solidify, the desired side molding 1 is obtained which consists of a core layer 3 and a skin layer 2 enveloping the core layer 3.

The side molding 1 thus formed is protected against marring due to the external skin layer 2 and retains good dimensional stability because of the diminished thermal expansion resulting from the central core layer 3.

In the sandwich molding described above, the molten resin for forming the skin layer 2 and the molten resin for forming the core layer 3 are cooled almost simultaneously. Although the two molten resins each shrinks during the cooling, the contraction of the molten resin for skin layer formation is apt to be more affected by the contraction of the molten resin for core layer formation. That is, the molten resin for skin layer formation is subjected to a pulling force from the contraction of the molten resin for core layer formation. Consequently, if the molten resin for skin layer formation does not contain a material which serves to diminish the flow of the resin, it shrinks while being pulled in the arrow directions shown in FIG. 2 due to the contraction of the molten resin for core layer formation.

In this example, however, since the molten resin for skin layer formation contains a filler in an amount of 1 to 50% by weight, the flow of the molten resin for skin layer formation is diminished by the function of the filler. In other words, the filler functions to maintain the shape of the molten resin for skin layer formation. Due to the effect of the filler, the molten resin for skin layer formation will withstand the pulling force attributable to the contraction of the molten resin for core layer formation to retain its shape, even when the molten resin for core layer formation shrinks considerably during the cooling of the two molten resins for skin layer formation and core layer formation.

Consequently, even if sink marks are formed as a result of the contraction of the molten resin for skin layer formation, the sink marks have a depth of less than 5 μm and cannot be seen by the naked eye. Thus, the side molding 1 obtained can have an excellent quality in appearance with no visible sink marks on those surface parts of the skin layer 2 which correspond to the side edges of the core layer 3.

As persons skilled in this art would understand, the present invention is not limited to the above-described example, and any modification may be made as long as it does not depart from the spirit of the invention. For example, the following modifications are possible.

Besides the automotive side molding 1, the present invention is useful for the production of other exterior automotive resin trims such as an under-door molding attachable to a lower part of a door, which seals the space between the door and body. Similarly, the invention may be used in producing an overfender attachable to the fender over a front or rear wheel in a body. The present invention is also applicable to sandwich moldings for use in fields other than automobiles.

The shape of side molding 1 described in the above example may be suitably modified.

As described above in detail, according to the present invention, it is possible to prevent visible sink marks from forming during molding on the skin layer surface at the parts corresponding to the side edges of the core layer. Thus, a sandwich molding may be obtained which has excellent appearance quality and which retains marring resistance and dimensional stability.

EXAMPLES II-1 TO II-5 AND COMPARATIVE EXAMPLES II-1 TO II-2

The following examples of an automotive side molding illustrate an embodiment of the sandwich molding according to the present invention, which examples are described in comparison with comparative examples.

Figure 2:
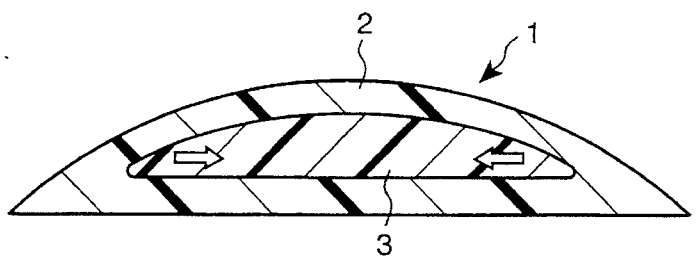
FIG. 2 is a cross-sectional view of the side molding as an embodiment.

FIGS. 1 and 2 show a side molding 1 which is in strip form as a whole and is to be attached to an exterior automotive body side with a double-sided tape, an adhesive, clips, etc. for the purpose of automotive-body protection or decoration. The side molding 1 consists of a hard core layer 3 having a section of a roughly semicylindrical shape and a soft skin layer 2 enveloping the core layer 3.

This side molding 1 is one formed by a conventional sandwich molding method. The sandwich molding method is one mode of injection molding. In this method, a molten resin for skin layer formation is first injected into a mold cavity. Several seconds later, the injection of the molten resin for skin layer formation is stopped and, simultaneously therewith, injection of a molten resin for core layer formation is begun. The molten resin for skin layer formation is pushed by the molten resin for core layer formation to flow in the cavity. When the cavity has been almost filled with the two molten resins, the injection of the molten resin for core layer formation is terminated. The molten resin for skin layer formation is again injected into the cavity. After the two molten resins cool and solidify, the desired side molding 1 is obtained which consists of a core layer 3 and a skin layer 2 enveloping the core layer 3.

For the purpose of examining in side molding 1 the relationship between the material composition for layers 2 and 3 and the generation of sink marks during sandwich molding, eight kinds of side moldings 1 were produced using the ingredients and formulations specified below (see Table 1).

TABLE 1

|  | Example |  |  |  |  |  |  | Comparative Example |  |
|---|---|---|---|---|---|---|---|---|---|
|  | II-1 | II-2 | II-3 | II-4 | II-5 | II-6 | II-7 | II-1 | II-2 |
|  | Skin Layer |  |  |  |  |  |  |  |  |
| PP(1) | — | 50 | 30 | 60 | 50 | 27 | 27 | 30 | 30 |
| PP(2) | 30 | — | — | — | — | — | — | — | — |
| SEBS | 45 | 40 | 45 | — | 40 | 41 | 41 | 45 | 45 |

TABLE 1-continued

|  | Example | | | | | | | Comparative Example | |
| --- | --- | --- | --- | --- | --- | --- | --- | --- | --- |
|  | II-1 | II-2 | II-3 | II-4 | II-5 | II-6 | II-7 | II-1 | II-2 |
| EPR (1) | — | — | — | 30 | — | — | — | — | — |
| LDPE | — | — | 15 | — | — | 14 | 14 | 15 | 15 |
| HDPE | 15 | — | — | — | — | — | — | — | — |
| Oil | 10 | 10 | 10 | 10 | 10 | 9 | 9 | 10 | 10 |
| Talc | — | — | — | — | — | 9 | 9* | — | — |
| Core Layer | | | | | | | | | |
| PP(3) | 45 | 45 | — | 45 | 45 | — | — | 45 | 30 |
| PP(1) | — | — | 45 | — | — | 45 | 45 | — | — |
| EPR (2) | 30 | 30 | 30 | 30 | — | 30 | 30 | 30 | 30 |
| SEBS | — | — | — | — | 30 | — | — | — | — |
| HDPE | — | — | — | — | — | — | — | — | 15 |
| Talc | 25 | 25 | 25 | 25 | 25 | 25 | 25 | 25 | 25 |

*calcium carbonate (Example II-1)

For forming a skin layer 2, the following ingredients were used: 30% by weight of ethylene-propylene block copolymer having a melt flow rate (MFR) of 30 (hereinafter referred to as "PP(2)"); 45% by weight of styrene-ethylene-butylene-styrene block copolymer having a styrene content of 33% by weight and a melt viscosity as measured on 20% toluene solution of 200 cP (hereinafter referred to as "SEBS"); 15% by weight of high-density polyethylene (hereinafter referred to as "HDPE"); and 10% by weight of paraffin oil (trade name PW-90, manufactured by Idemitsu Kosan Co., Ltd., Japan; hereinafter referred to simply as "oil").

For forming a core layer 3, the following ingredients were used: 45% by weight of ethylene-propylene block copolymer having an MFR of 40 (hereinafter referred to as "PP(3)"); 30% by weight of ethylene-propylene random copolymer having a Mooney viscosity $ML_{1+4}$ (100° C.) of 24 and a propylene content of 26% by weight (hereinafter referred to as "EPR(2)"); and 25% by weight of talc.

(Example II-2)

The ingredients for forming a skin layer 2 were 50% by weight of ethylene-propylene block copolymer having an MFR of 33 (hereinafter referred to as "PP(1)"), 40% by weight of SEBS, and 10% by weight of oil.

For forming a core layer 3, the same ingredients as those in Example II-1 above were used.

(Example II-3)

The ingredients for forming a skin layer 2 were 30% by weight of PP(1), 45% by weight of SEBS, 15% by weight of low-density polyethylene (hereinafter referred to as "LDPE"), and 10% by weight of oil.

The ingredients for forming a core layer 3 were 45% by weight of PP(1), 30% by weight of EPR(2), and 25% by weight of talc.

(Example II-4)

The ingredients for forming a skin layer 2 were 60% by weight of PP(1), 30% by weight of ethylene-propylene random copolymer having a Mooney viscosity $ML_{1+4}$ (100° C.) of 70 and a propylene content of 27% by weight (hereinafter referred to as "EPR(1)"), and 10% by weight of oil.

For forming a core layer 3, the same ingredients as those in Examples II-1 and II-2 above were used.

(Example II-5)

For forming a skin layer 2, the same ingredients as those in Example II-2 above were used.

The ingredients for forming a core layer 3 were 45% by weight of PP(3), 30% by weight of SEBS, and 25% by weight of talc.

(Example II-6)

For forming a skin layer 2, the same ingredients as those in Example II-3 above were used except that 9% by weight of talc was used, and the amount of the ingredients were changed as shown in Table 1.

For forming a core layer 3, the same ingredients as those in Example II-3 above were used.

(Example II-7)

For forming a skin layer 2, the same ingredients as those in Example II-6 above were used except that 9% by weight of calcium carbonate was used in place of 9% by weight of talc.

For forming a core layer 3, the same ingredients as those in Example II-6 above were used.

(Comparative Example II-1)

For forming a skin layer 2, the same ingredients as those in Example II-3 above were used.

For forming a core layer 3, the same ingredients as those in Examples II-1, II-2, and II-4 above were used.

(Comparative Example II-2)

For forming a skin layer 2, the same ingredients as those in Example II-3 above were used.

The ingredients for forming a core layer 3 were 30% by weight of PP(3), 30% by weight of EPR(2), 15% by weight of HDPE, and 25% by weight of talc.

With respect to each of the side moldings 1 consisting of the ingredients described in Examples II-1 to II-7 and Comparative Examples II-1 to II-2 given above, the crystalline polypropylene resin content in the skin layer 2 (the content being hereinafter referred to as "PP(S)") and that in the core layer 3 (the content being hereinafter referred to as "PP(C)") were determined. Further, with respect to each side molding 1, the total heat of fusion of the crystalline resin contained in the skin layer 2 in a range of from 100° C. to 180° C. (the total being hereinafter referred to as "Q(S)") and that of the crystalline resin contained in the core layer 3 in a range of from 100° C. to 180° C. (the total being hereinafter referred to as "Q(C)") were determined. In the Q(S) and Q(C) above, the heat of fusion of polyethylene is included. Furthermore, the melting point of the crystalline polypropylene resin contained in the skin layer 2 (the melting point being hereinafter referred to as "Mp(S)") and that of the crystalline polypropylene resin contained in the core layer 3 (the melting point being hereinafter referred to as "Mp(C)") were determined for each side molding 1.

Figure 3:
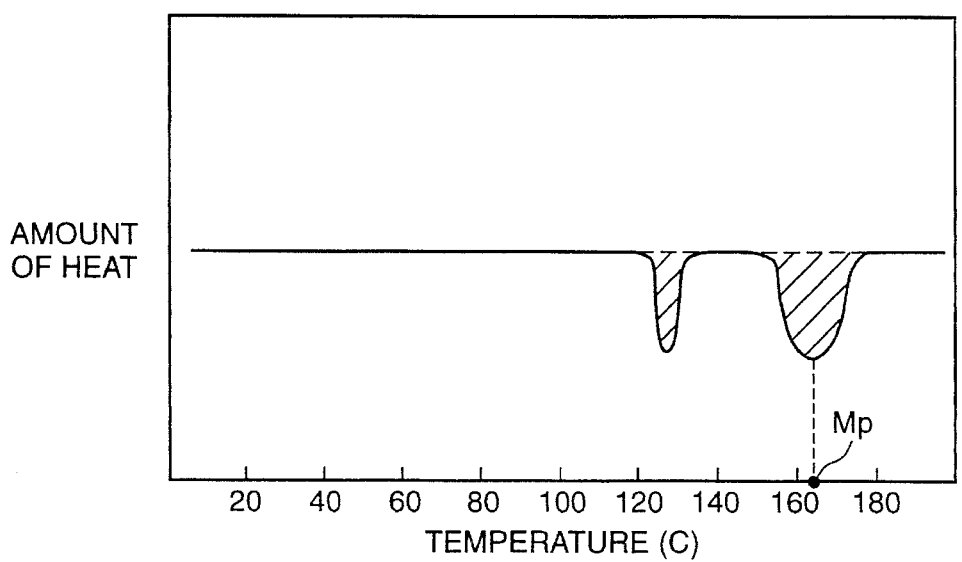
FIG. 3 is a chart showing the relationship between temperature and the amount of heat measured with a differential scanning calorimeter.
Figure 4:
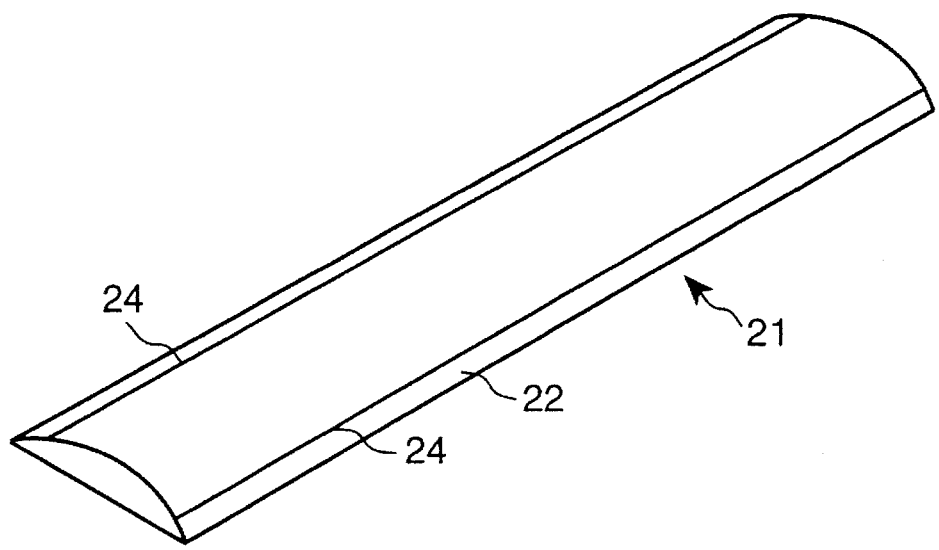
FIG. 4 is a perspective view of a conventional side molding.
Figure 5:
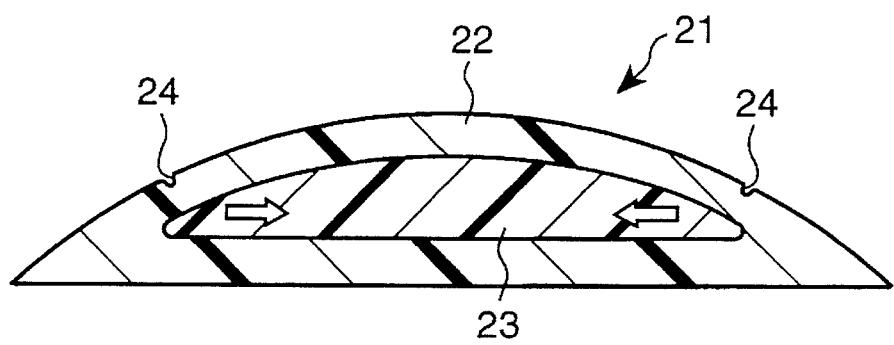
FIG. 5 is a cross-sectional view of the conventional side molding.

For determining the heat of fusion and melting point, a differential scanning calorimeter (DSC) was used. In this measurement, 3±0.1 mg of a sample annealed under conditions of 100° C. and 2 hours was heated from 23° C. to 200° C. at a heating rate of 20° C./min. The method of determining heat of fusion is shown in FIG. 3; the sum of the areas of the hatched parts in the figure corresponds to the total heat of fusion (Q(S) or Q(C)).

The unit for PP(S) and PP(C) is "wt %", that for Q(S) and Q(C) is "cal/g", and that for Mp(S) and Mp(C) is "°C".

From the values of the various properties described above, each of the absolute values of the variation between PP(S) and PP(C) (|PP(S)–PP(C)|), the variation between Q(C) and Q(S) (Q(C)–Q(S)), and the absolute value of the variation between Mp(S) and Mp(C) (|Mp(S)–Mp(C)|) was calculated.

Each side molding 1 was evaluated with the naked eye for sink marks on the surface of the skin layer 2. The results of the above calculations and of the evaluation are shown in Table 2.

Q(S), is proportional to the shrinkage of the crystalline resin during the crystallization thereof from the molten state, while the total heat of fusion of the crystalline resin contained in the core layer 3, Q(C), is proportional to the shrinkage of the crystalline resin during the crystallization thereof from the molten state. Therefore, since the total heat of fusion of the crystalline resin (mostly a crystalline polypropylene resin) in the skin layer 2, Q(S), and that of the crystalline resin (mostly a crystalline polypropylene resin) in the core layer 3, Q(C), are closer to each other in Examples II-1 to II-7 than in Comparative Examples II-1 to II-2, the shrinkages of the two crystalline resins in the respective two layers 2 and 3 in the Examples are also closer to each other.

This means that when the molten resin for skin layer formation and the molten resin for core layer formation cool and solidify, the two resins shrink in almost the same degree. Because of this, excessive stress is not imposed, in the cooling step in sandwich molding, on those parts of the surface of the skin layer 2 which correspond to the side edges of the core layer 3. Consequently, sink mark formation

TABLE 2

|  | Example | | | | | | | Comparative Example | |
| --- | --- | --- | --- | --- | --- | --- | --- | --- | --- |
|  | II-1 | II-2 | II-3 | II-4 | II-5 | II-6 | II-7 | II-1 | II-2 |
| PP (S) | 30 | 50 | 30 | 60 | 50 | 30 | 30 | 30 | 30 |
| PP (C) | 45 | 45 | 45 | 45 | 45 | 45 | 45 | 45 | 30 |
| Q(S) | 21.1 | 15.7 | 14.6 | 21.8 | 15.7 | 13.6 | 13.4 | 14.6 | 14.6 |
| Q(C) | 22.0 | 22.0 | 19.8 | 22.0 | 20.6 | 19.8 | 19.8 | 22.0 | 21.2 |
| Mp (S) | 159.1 | 155.5 | 155.6 | 157.6 | 155.6 | 155.5 | 155.6 | 155.6 | 155.6 |
| Mp (C) | 160.7 | 160.7 | 152.1 | 160.7 | 160.2 | 152.6 | 152.1 | 160.7 | 162.1 |
| |PP(S)-PP(G)| | 15 | 5 | 15 | 15 | 5 | 15 | 15 | 15 | 0 |
| Q(C)-Q(S) | 1.9 | 6.3 | 5.3 | 0.2 | 4.9 | 6.2 | 6.4 | 7.4 | 9.9 |
| |Mp(S)-Mp(C)| | 1.6 | 5.2 | 3.5 | 3.1 | 4.7 | 3.4 | 3.5 | 5.1 | 6.5 |
| Sink Mark | None | None | None | None | None | None | None | Present | Present |

Table 2 indicates that there is a correlation between Q(C)–Q(S) and the occurrence of sink marks. That is, the side moldings of Examples II-1 to II-7 in which the values of Q(C)–Q(S) were in the range of from 0.2 to 6.4 cal/g had not generated a visible sink mark, whereas the side moldings of Comparative Examples II-1 to II-2 in which the values of Q(C)–Q(S) were in the range of from 7.4 to 9.9 cal/g had generated visible sink marks.

The reason for the nonoccurrence of visible sink marks in Examples II-1 to II-7 in contrast to the occurrence of visible sink marks in Comparative Examples II-1 to II-2 may be that the shrinkages of the two molten resins upon cooling and solidification in the cavity during sandwich molding are close to each other. Illustratively stated, each of the crystalline resins contained in the skin layer 2 and the core layer 3 undergoes considerable shrinkage during the crystallization thereof by cooling from the molten state. The components having the largest shrinkage in the materials for forming the skin layer 2 are the crystalline polypropylene resins (PP(1) and PP(2)). Likewise, the components having the largest shrinkage in the materials for forming the core layer 3 are the crystalline polypropylene resins (PP(1), PP(2), and PP(3)), followed by the crystalline polyethylene resins (HDPE and LDPE). Therefore the shrinkage of the molten resin for skin layer formation and the molten resin of the molten resin for core layer formation during cooling and solidification is mainly governed by the total shrinkage of these crystalline resins.

On the other hand, it is assumed that the total heat of fusion of the crystalline resin contained in the skin layer 2, is inhibited, which imparts an excellent quality of appearance to the side molding 1 obtained.

It is assumed from Table 2 that when the equation Q(C)–Q(S)≦7 cal/g is satisfied, sink marks will not develop on the surface of the skin layer 2. An especially good quality of appearance is achieved when |PP(S)–PP(C)|≦10 wt % or |Mp(S)–Mp(C)|≦5° C.

Each of the side moldings 1 obtained in Examples II-1 to II-7 given above is protected against marring by the external skin layer 2, and each retains good dimensional stability because of the diminished thermal expansion of the central core layer 3.

As persons skilled in this art would be aware, the present invention is not limited to the above-described examples and any modification may be made as long as it does not depart from the spirit of the invention. For example, the following modifications are possible.

Besides the automotive side molding 1, the present invention is applicable to other exterior automotive resin trims such as an under-door molding attachable to a lower part of a door, which seals the space between the door and body. Similarly, the invention may be applicable in producing an overfender attachable to the fender over a front or rear wheel in a car body. The present invention is also applicable to sandwich moldings for use in fields other than automobiles.

The shape of side moldings 1 described in the above examples may be suitably modified.

As described above in detail, according to the present invention, it is possible to prevent sink marks from forming during molding on the skin layer surface at its parts corresponding to the side edges of the core layer. Thus, a sandwich molding having an excellent quality of appearance may be obtained.

EXAMPLE III

An example of one embodiment of the present invention will be explained below by reference to FIGS. 1, 2 and 6 to 11.

FIGS. 1 and 2 show a side molding 1, as a resin article, which is in strip form as a whole and is to be attached to an exterior automotive body side with a double-sided tape, an adhesive, clips, etc. for the purpose of automotive-body protection or decoration. This side molding 1 consists of a hard core layer 3 having a section of a roughly semicylindrical shape and a soft skin layer 2 enveloping the core layer 3. More particularly, the skin layer 2 is made of a styrene-based thermoplastic elastomer containing a crystalline polypropylene resin (the elastomer being hereinafter referred to simply as "soft resin"). The core layer 3 is made of a mixture comprising a crystalline polypropylene resin having a low coefficient of linear expansion and an ethylene-α-olefin copolymer (the mixture being hereinafter referred to simply as "hard resin").

The following is an explanation of a mold 4 for use in molding the side molding 1 described above.

Figure 6:
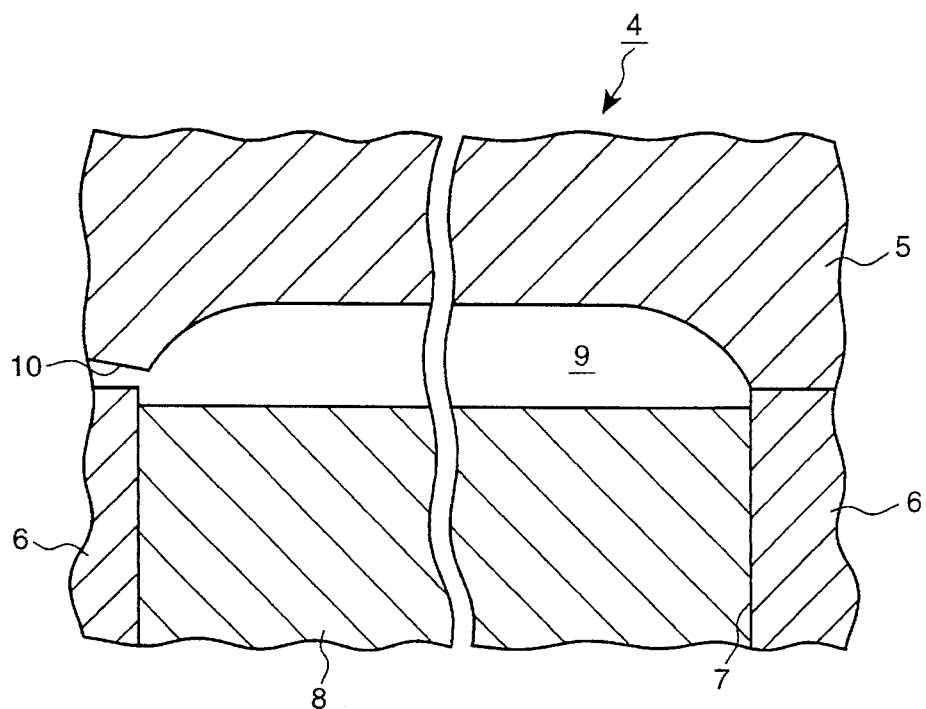
FIG. 6 is a cross-sectional view of a mold for use in molding a side molding as an embodiment.

As FIG. 6 shows, the mold 4 comprises a stationary half 5 in the upper position in the figure and a movable half 6 in the lower position in the figure. The movable half 6 has a housing space 7, in which a slide core 8 is disposed so that it is movable up and down. The stationary half 5, movable half 6, and slide core 8 form a cavity 9 in which the side molding 1 is to be molded. At the beginning of a molding cycle, the slide core 8 is disposed at a slightly lower position so that the cavity 9 has a slightly larger volume than the side molding 1. The stationary half 5 has a gate 10 for molten resin injection at one longitudinal end of the cavity 9. At the other end of the cavity 9, the stationary half 5 is provided with a tab not shown in the drawing, in order that the excess resin can be withdrawn to regulate the shape of that end of the side molding 1.

The process for molding the side molding 1 using the mold 4 described above is then explained below along with effects thereof.

Figure 7:
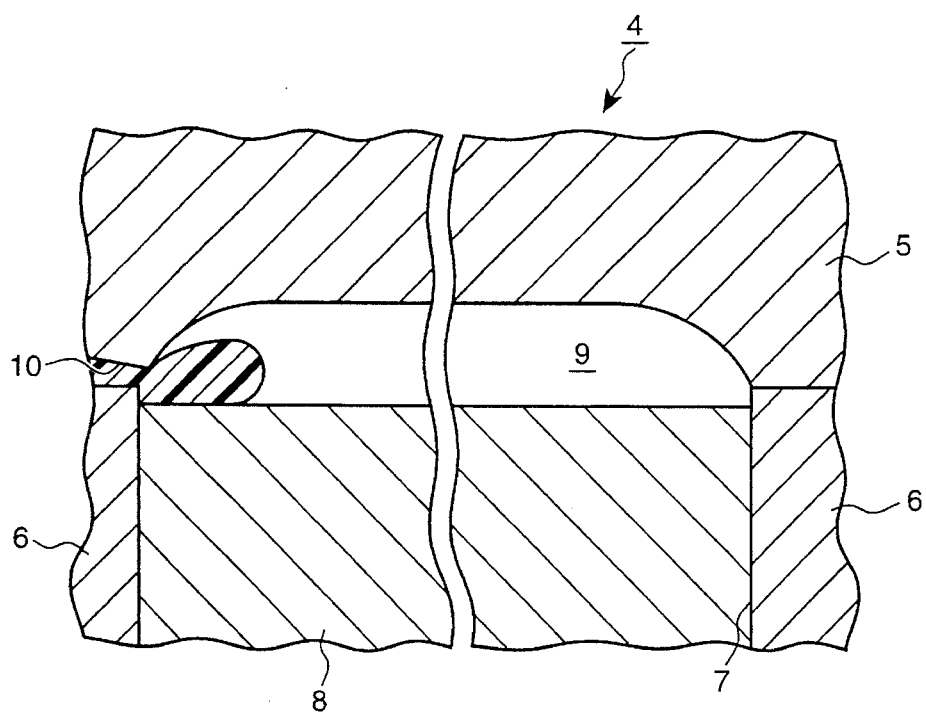
FIG. 7 is a cross-sectional view showing the state that a soft resin has been injected into the cavity of mold for use in molding a side molding as an embodiment.
Figure 8:
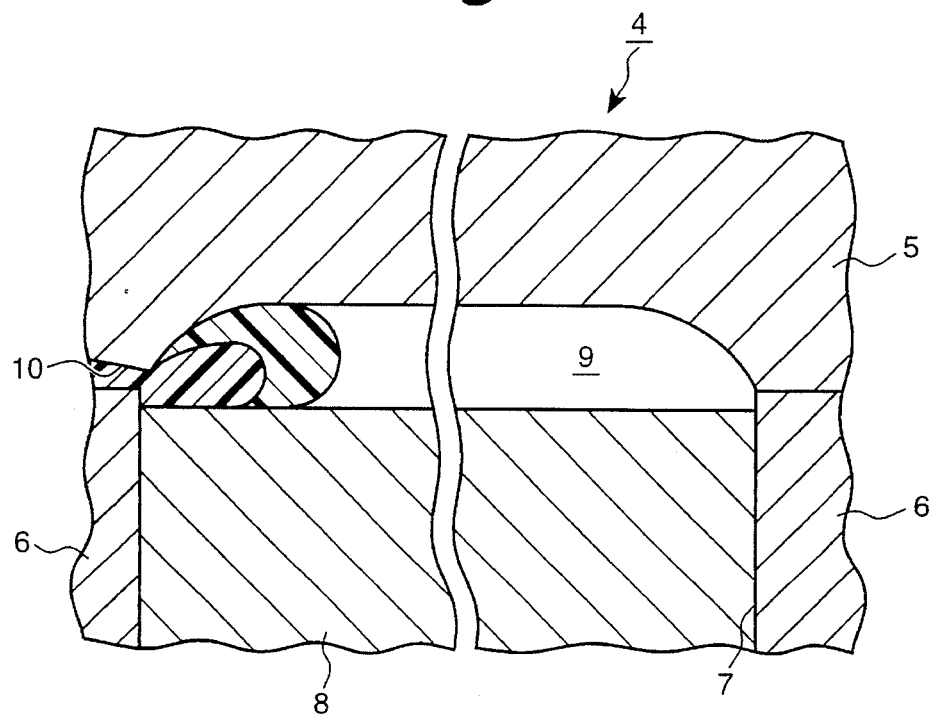
FIG. 8 is a cross-sectional view showing the state that a hard resin has been injected into the cavity of the mold for use in molding a side molding as an embodiment.

As described above, the slide core 8 is disposed at a slightly lower position at the beginning of a molding cycle. First, a molten soft resin as the first molten resin is injected through the gate 10 into the cavity 9 in the direction of the length thereof, with the slide core being at that position, as shown in FIG. 7. A molten hard resin as the second molten resin is then injected, as shown in FIG. 8, into the cavity 9 in the direction of the length thereof. This injection of the hard resin may be conducted either almost simultaneously with the injection of the soft resin or at several seconds after the injection of the soft resin. It is also possible to inject the soft resin further immediately after the injection of the hard resin.

Figure 9:
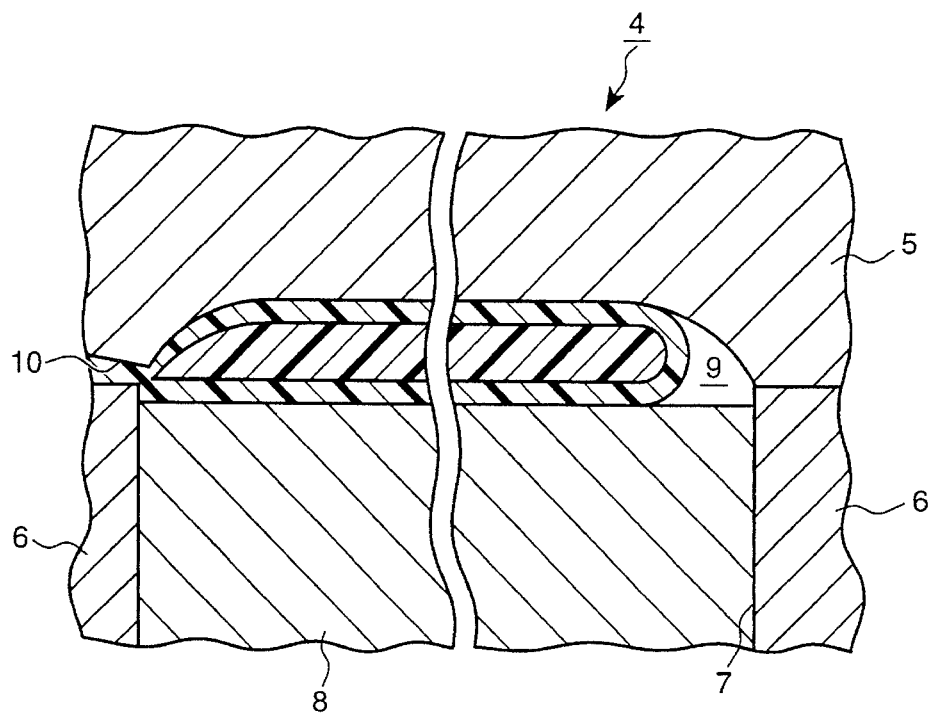
FIG. 9 is a cross-sectional view showing the state that the two resins have been almost provided to the mold for use in molding a side molding as an embodiment.
Figure 10:
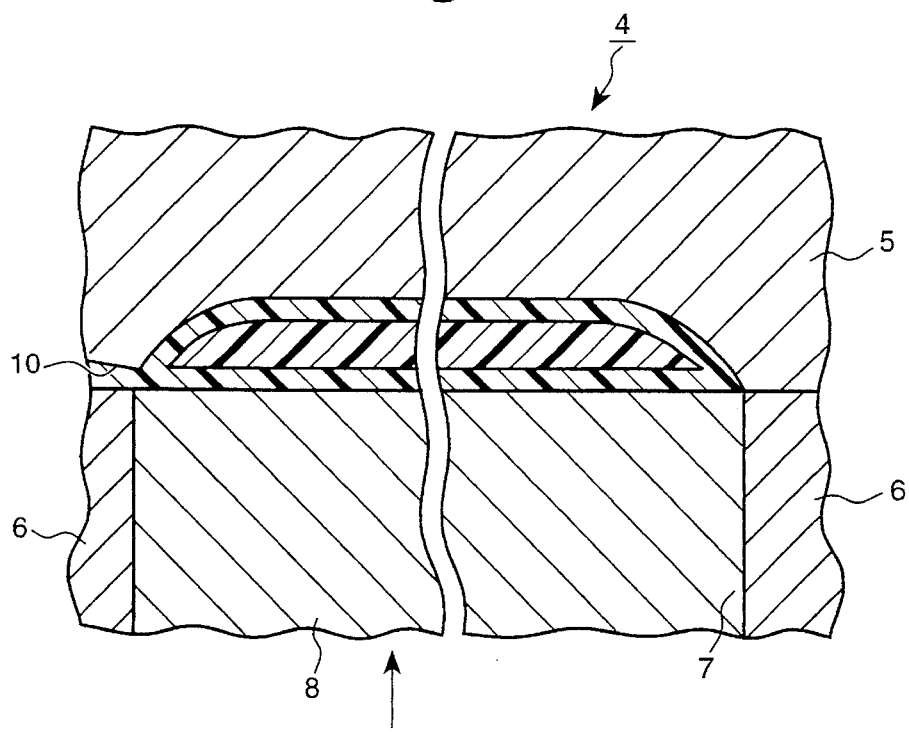
FIG. 10 is a cross-sectional view showing the state that the slide core has been moved in the mold for use in molding a side molding as an embodiment.
Figure 11:
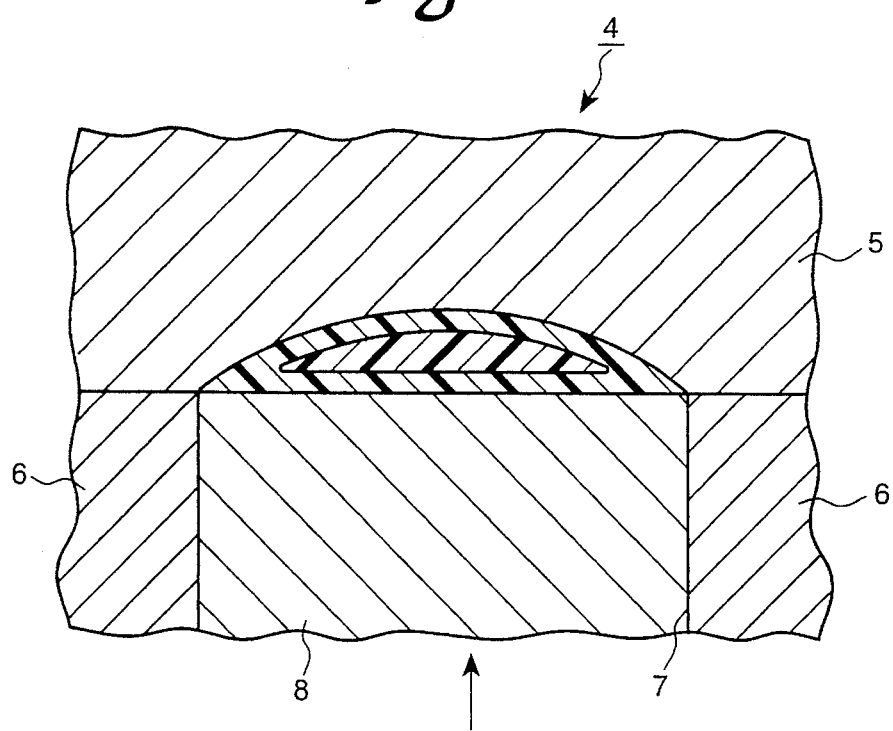
FIG. 11 is a cross-sectional view showing the state that the slide core has been moved in the mold for use in molding a side molding as an embodiment.

By thus conducting the injection operations, the two molten resins extend in the cavity 9 in such a manner that the molten hard resin is enveloped by the molten soft resin as shown in FIG. 9. After the two molten resins have been injected in predetermined amounts (the amounts necessary for forming the side molding 1), the slide core 8 is moved upward as shown in FIGS. 10 and 11. Upon this movement, the volume of the cavity 9 decreases and the two molten resins are compressed.

The two molten resins are thereafter cooled and solidified and the resulting resin molding is taken out of the mold 4, whereby the side molding 1 consisting of a core layer 3 and a skin layer 2 is obtained.

The side molding 1 thus obtained can retain excellent marring resistance because the skin layer 2 is made of a styrene-based thermoplastic elastomer containing a crystalline polypropylene resin. It can further retain excellent dimensional stability because the core layer 3 is made of a crystalline polypropylene resin having a low coefficient of linear expansion.

When the molten hard resin and the molten soft resin cool during molding, the two resins shrink. In this example, however, the slide core 8 is moved to compress the two resins. Since both of the two resins are thus already in a compressed state during cooling, the shrinkages of the molten resins for forming the core layer 3 and the skin layer 2 upon cooling can be relatively small even when the two resins are not particularly limited to specific ones. Consequently, the stress imposed on each resin due to a shrinkage difference can be low. As a result, the generation of sink marks on the surface of the skin layer 2 at its parts corresponding to the side edges of the core layer 3 can be prevented without fail, leading to an improvement in appearance quality.

The present invention is not limited to the above-described example and the invention may be suitably modified as long as the modification does not depart from the spirit of the invention. For example, the following modifications are possible.

Although the side molding 1 was taken in the above example as an embodiment of the resin article, other possible embodiments of the resin article include bumpers, bumper moldings, garnishes, and the like.

Although the embodiment in the above example employed, as the resin constituting the skin layer 2, a crystalline polypropylene resin having a low coefficient of linear expansion and also employed, as the resin constituting the core layer 3, a styrene-based thermoplastic elastomer containing a crystalline polypropylene resin, the two resins respectively constituting the layers 2 and 3 are not particularly limited and any resinous materials suited for imparting the desired properties to the layers 2 and 3 may be selected. Various ingredients such as fillers and glass fibers may be incorporated into the resinous materials.

The mold used in the above example may have such a constitution that the slide core 8 is disposed in the stationary half 5, or may have such a constitution that the gate 10 is disposed in the movable half 6.

As described above in detail, the process of the present invention for molding a resin article has an excellent effect that the generation of sink marks during molding on the skin layer surface at its parts corresponding to the side edges of the core layer can be prevented even when the materials are not strictly limited to specific ones and, as a result, improvement in appearance quality can be achieved.

While the invention has been described in detail and with reference to specific embodiments thereof, it will be apparent to one skilled in the art that various changes and modifications can be made therein without departing from the spirit and scope thereof.

What is claimed is:

1. A sandwich molding comprising:

a core layer covered by a skin layer said skin layer comprising either an olefin-based thermoplastic elastomer or a styrene-based thermoplastic elastomer, said core layer comprising either a mixture comprising at least a crystalline polypropylene resin and an ethylene-α-olefin copolymer or a mixture comprising at least a crystalline polypropylene resin and a styrene-based elastomer, wherein said skin layer further contains a filler in an amount of 1 to 50% by weight.

2. The sandwich molding as claimed in claim 1, wherein the olefin-based thermoplastic elastomer contains a crystalline polypropylene resin in an amount of 10% by weight or more.

3. The sandwich molding as claimed in claim 1, wherein said filler is contained in the skin layer in an amount of 1 to 30% by weight.

4. A sandwich molding comprising:

a core layer covered by a skin layer said skin layer comprising either an olefin-based thermoplastic elastomer or a styrene-based thermoplastic elastomer, said core layer comprising either a mixture comprising at least a crystalline polypropylene resin and an ethylene-α-olefin copolymer or a mixture comprising at least a crystalline polypropylene resin and a styrene-based elastomer, wherein said skin layer and core layer are formed with materials such that, in the temperature range of from 100° C. to 180° C., the heat of fusion for the crystalline resin contained in the core layer and the heat of fusion for the crystalline resin contained in the skin layer varies 7 cal/g or less.

5. The sandwich molding as claimed in claim 4, wherein the olefin-based thermoplastic elastomer contains a crystalline polypropylene resin in an amount of 10% by weight or more or the styrene-based thermoplastic elastomer contains a crystalline polypropylene resin in an amount of 10% by weight or more.

6. A sandwich molding comprising:

a core layer covered by a skin layer said skin layer comprising either an olefin-based thermoplastic elastomer or a styrene-based thermoplastic elastomer, said core layer comprising either a mixture comprising at least a crystalline polypropylene resin and an ethylene-α-olefin copolymer or a mixture comprising at least a crystalline polypropylene resin and a styrene-based elastomer, wherein said skin layer further contains a filler in an amount of 1 to 50% by weight, said skin layer and core layer are formed with materials such that, in the temperature range of from 100° C. to 180° C., the heat of fusion for the crystalline resin contained in the core layer and the heat of fusion for the crystalline resin contained in the skin layer varies 7 cal/g or less.

7. The sandwich molding as claimed in claim 1, wherein the olefin-based thermoplastic elastomer contains a crystalline polypropylene resin in an amount of 10% by weight or more or the styrene-based thermoplastic elastomer contains a crystalline polypropylene resin in an amount of 10% by weight or more.

8. The sandwich molding as claimed in claim 6, wherein said filler is contained in the skin layer in an amount of 1 to 30% by weight.

* * * * *